United States Patent
Lee et al.

(10) Patent No.: US 10,500,547 B2
(45) Date of Patent: Dec. 10, 2019

(54) GRAPHENE MEMBRANE FILM FOR SOLVENT PURIFICATION, METHOD FOR PRODUCING SAME, AND SOLVENT PURIFICATION SYSTEM USING SAME

(71) Applicant: SOULBRAIN CO., LTD., Gyeonggi-do (KR)

(72) Inventors: Seung hyun Lee, Gyeonggi-do (KR); Seok joo Kim, Gyeonggi-do (KR)

(*) Notice: Subject to any disclaimer, the term of this patent is extended or adjusted under 35 U.S.C. 154(b) by 212 days.

(21) Appl. No.: 15/539,941

(22) PCT Filed: Aug. 12, 2015

(86) PCT No.: PCT/KR2015/008442
§ 371 (c)(1),
(2) Date: Jun. 26, 2017

(87) PCT Pub. No.: WO2016/104910
PCT Pub. Date: Jun. 30, 2016

(65) Prior Publication Data
US 2018/0001267 A1 Jan. 4, 2018

(30) Foreign Application Priority Data

Dec. 26, 2014 (KR) .................. 10-2014-0190303

(51) Int. Cl.
*B01D 67/00* (2006.01)
*C01B 32/192* (2017.01)
(Continued)

(52) U.S. Cl.
CPC ..... *B01D 67/0069* (2013.01); *B01D 67/0067* (2013.01); *B01D 69/02* (2013.01);
(Continued)

(58) Field of Classification Search
CPC .. B01D 67/0069; B01D 69/02; B01D 71/021; B01D 2325/04; B01D 2323/08;
(Continued)

(56) References Cited

U.S. PATENT DOCUMENTS

2003/0070238 A1 4/2003 Radomyselski et al.
2006/0207934 A1 9/2006 Vernik et al.
(Continued)

FOREIGN PATENT DOCUMENTS

CN 103367773 A 10/2013
CN 104192836 A 12/2014
(Continued)

OTHER PUBLICATIONS

European Patent Office, Extended European Search Report of corresponding EP Patent Application No. 15873438.4, dated Nov. 23, 2017.

*Primary Examiner* — Vishal V Vasisth
(74) *Attorney, Agent, or Firm* — Jongkook Park (57) ABSTRACT

Described embodiments include a graphene membrane film for solvent purification and related method, and a solvent purification system using same. The graphene membrane film for solvent purification is formed having a plurality of stacked graphene plate-shaped flakes, and at least one pair of the plurality of stacked graphene plate-shaped flakes comprises a physical bond or a chemical bond connecting layers. The graphene membrane film for solvent purification is produced by preparing a graphene oxide dispersion liquid by dispersing graphene oxide in distilled water; confining the graphene oxide dispersion liquid between a pair of substrates; and applying heat and pressure to the graphene oxide dispersion liquid between the substrates to perform a hydrothermal reaction to concurrently thermally reduce the graphene oxide and bind graphenes. Due to lipophilic surface property and fine pores, size exclusion separation and hydro- (Continued)

philic-lipophilic component separation through polarity may be realized, and thus is usable in fine chemistry fields.

10 Claims, 4 Drawing Sheets (51) Int. Cl.
    *B01D 69/02*      (2006.01)
    *B01D 71/02*      (2006.01)
    *C01B 32/182*      (2017.01)
    *B01D 69/06*      (2006.01)
    *B82Y 30/00*      (2011.01)
    *B82Y 40/00*      (2011.01)

(52) U.S. Cl.
    CPC ........... *B01D 69/06* (2013.01); *B01D 71/021* (2013.01); *C01B 32/182* (2017.08); *C01B 32/192* (2017.08); *B01D 2313/143* (2013.01); *B01D 2313/146* (2013.01); *B01D 2313/243* (2013.01); *B01D 2323/08* (2013.01); *B01D 2323/10* (2013.01); *B01D 2323/30* (2013.01); *B01D 2323/50* (2013.01); *B01D 2325/04* (2013.01); *B01D 2325/20* (2013.01); *B82Y 30/00* (2013.01); *B82Y 40/00* (2013.01); *C01B 2204/04* (2013.01); *Y10S 977/734* (2013.01); *Y10S 977/842* (2013.01)

(58) Field of Classification Search
    CPC ....... B82Y 40/00; B82Y 30/00; C01B 32/192; C01B 2204/04; Y10S 977/734; Y10S 977/842

See application file for complete search history.

(56) References Cited

U.S. PATENT DOCUMENTS

| | | | |
|---|---|---|---|
| 2006/0234892 | A1 | 10/2006 | Radomyselski et al. |
| 2009/0188391 | A1 | 7/2009 | Vernik et al. |
| 2010/0301279 | A1 | 12/2010 | Nesper et al. |
| 2012/0161192 | A1 | 6/2012 | Kim et al. |
| 2012/0255899 | A1 | 10/2012 | Choi et al. |
| 2014/0069277 | A1 | 3/2014 | Choi et al. |
| 2014/0127488 | A1* | 5/2014 | Zhamu ................ H01B 1/04 428/216 |
| 2014/0242496 | A1 | 8/2014 | Ryu et al. |
| 2014/0308449 | A1 | 10/2014 | Zhamu et al. |
| 2015/0270548 | A1 | 9/2015 | Nesper et al. |

FOREIGN PATENT DOCUMENTS

| | | |
|---|---|---|
| EP | 2256087 A1 | 12/2010 |
| EP | 2511002 A1 | 10/2012 |
| KR | 10-2007-0114738 A | 12/2007 |
| KR | 10-2012-0049679 A | 5/2012 |
| KR | 10-2012-0070973 A | 7/2012 |
| KR | 10-2013-0021051 A | 3/2013 |
| KR | 10-2013-0029854 A | 3/2013 |
| KR | 10-1278072 B1 | 6/2013 |
| KR | 10-2014-0057079 A | 5/2014 |
| KR | 10-2014-0105668 A | 9/2014 |

* cited by examiner

GRAPHENE MEMBRANE FILM FOR SOLVENT PURIFICATION, METHOD FOR PRODUCING SAME, AND SOLVENT PURIFICATION SYSTEM USING SAME

CROSS REFERENCE TO RELATED APPLICATIONS

This application is a National Stage Patent Application of PCT International Patent Application No. PCT/KR2015/008442 (filed on Aug. 12, 2015) under 35 U.S.C. § 371, which claims priority to Korean Patent Application No. 10-2014-0190303 (filed on Dec. 26, 2014), the teachings of which are incorporated herein in their entireties by reference.

TECHNICAL FIELD

Embodiments of the present disclosure relates to a graphene membrane film for solvent purification, a method for producing the same, and a solvent purification system using the same. More particularly, embodiments of the present disclosure relate to a graphene membrane film having lipophilic surface properties and fine pores and capable of being used for hydrophic-lipophilic component separation and size-exclusion separation, thereby useable in fine chemistry fields for solvent purification, a method for producing the same, and a solvent purification system.

BACKGROUND ART

A typical method for solvent purification and "moisture removal" is a thermal distillation. Since a solvent is very volatile, thermal distillation has a serious fire risk and a serious explosion risk. In addition, removing moisture from a solvent is a very inefficient method. Typically, distillation involves use of an appropriate drying agent. A typical drying agent may be Li, Na, K, $CaH_2$, $LiAlH_4$, or the like. These drying agents are very dangerous due to very high reactivity thereof. Over several years, many fires and explosions have been associated with thermal distillation of solvents. Chemists specify thermal distillation as one of the most dangerous processes among ordinary processes chemists use. Furthermore, maintenance of a distillation device and quenching of a drying agent is labor intensive.

Another purification method is a method using a so-called "Grubbs" device that uses a large solvent storage tank and an alumina/catalyst column so as to dry a solvent and remove oxygen to a desired degree of purity without using a thermo-reactive or water-reactive drying agent. The Grubbs device involves many empirical formulae and research space. The system uses a large storage drum accommodating 15 liters to 20 liters of a solvent and a column or a cylinder, which typically has a height of more than 10 inches and a diameter of more than 3 inches. A plurality of columns are used and connected in series. Each of the columns accommodates an activated filtering medium removing pollutants from a solvent when the solvent passes through the column. The solvent passes though the column only once to be filtered. When the solvent reaches a final column, the solvent is sufficiently filtered.

In order to exhaust all dangerous solvent fumes, a drum storage tank is typically filled with the solvent under a fume hood. The solvent may be supplied to a 4-liter container. Therefore, a plurality of containers should be used for filling the drum. The solvent may also be supplied to a large container such as a 10-liter container or a 20-liter container. Such a container commonly has heavy weight. In addition, it may be difficult or impossible to pour contents of the container into the drum storage tank under the fume hood.

On the other hand, purity of the solvent is a main point in a chemical industry handling a pure material such as fine chemicals. Typically, in order to purify a solvent during organic synthesis, distillation is performed several times, or moisture is removed by using a molecular sieve. In the case of distillation, in order to achieve the purpose of obtaining a pure solvent by using a boiling point difference, particle impurities and moisture may be simultaneously removed, but convenience of use is low and a freshly distilled solvent is difficult to instantly obtain as needed. The distillation is restrictively used so as to achieve the purpose of moisture removal by purifying a solvent by adding a molecular sieve to the solvent or allowing the molecular sieve to pass through a molecular sieve column, and generally, moisture may be removed to a level of 5 ppm.

Moisture in impurities included in a solvent is important in, in particular, carbonate series that are a main solvent of an electrolyte used in a lithium secondary battery. A carbonate-based solvent having high hygroscopic properties generally contains moisture of 200 ppm or more before molecular sieve purification, and contains moisture of 50 ppm after purification. Thus, when a lithium secondary battery is manufactured and operated, a battery swells or a negative or positive electrode material is deformed through a charging/discharging process. Therefore, capacity and a lifespan of the battery are decreased. Such a phenomenon is exponentially affected by a moisture content. Although the solvent purification and the moisture removal are important areas in fine chemicals, a conventional purification system has generally been used.

Recently, graphene has attracted attention as a candidate substance for developing a high performance material used in emitting heat and shielding an electromagnetic wave. It has been reported that the graphene had excellent properties due to excellent physical, chemical, and mechanical properties of the graphene, as compared to a material such as graphite or ceramic used in the past.

A graphene film may be produced through various methods. A method for producing a graphene film may be classified into a dry method and a wet method. As for the dry method, a graphene film is produced by forming a graphene layer by depositing graphene on a copper or nickel thin film in a single layer or several layers through vapor deposition, transferring the graphene layer formed on a metal thin film onto a plastic film substrate or the like by using a supporter such as Poly (methyl methacrylate) (PMMA) or the like, and removing the rear metal thin film through etching or the like. In the case of a chemical vapor deposition described above, there is environmental difficulty because graphene is formed in vacuum, a producing process is complicated, and a process of etching the rear metal thin film is necessarily performed for transparency of the graphene.

As for a general wet method, a graphene film is produced by preparing reduced graphene oxide, dispersing the reduced graphene oxide in a solvent, and coating the resultant solution on a target base material. In order to obtain a more uniform coating material than the produced graphene film, a graphene film is produced by coating graphene oxide on a film, drying the graphene oxide, and then, reducing the graphene oxide coated on the film by exposing the graphene oxide to a reducing agent gas such as hydrogen iodide (HI). In this case, since small graphene flakes are stacked through drying, it is difficult to exhibit basic physical excellence of the graphene.

PRIOR ART DOCUMENTS

Patent Document (Patent Document 1) Korean Patent Application Publication No. 2007-0114738 (Publication date: Dec. 4, 2007)
(Patent Document 2) Korean Patent Registration No. 1278072 (Registration date: Jun. 18, 2013)
(Patent Document 3) Korean Patent Registration No. 1294223 (Registration date: Aug. 1, 2013)
(Patent Document 4) Korean Patent Application Publication No. 2012-0049679 (Publication date: May 17, 2012)
(Patent Document 5) Korean Patent Application Publication No. 2013-0029854 (Publication date: Mar. 26, 2013).
(Patent Document 6) Korean Patent Application Publication No. 2014-0105668 (Publication date: Sep. 2, 2014)

DISCLOSURE

Technical Problem

An object of the present disclosure provides a graphene membrane film having lipophilic surface properties and fine pores and capable of being used for hydrophilic-lipophilic component separation and size-exclusion separation through a polarity caused by it's properties, thereby usable in fine chemistry fields for solvent purification, and a method for producing the same.

Another object of the present disclosure provides a solvent purification system capable of ultrapurely purifying a solvent by using a graphene membrane film that has lipophilic surface properties and fine pores and is capable of being used for hydrophilic-lipophilic component separation and size-exclusion separation through a polarity caused by it's properties, thereby usable in fine chemistry fields for solvent purification.

Technical Solution

An embodiment of a graphene membrane film for solvent purification includes: a plurality of stacked graphene plate-shaped flakes, wherein at least one pair of the plurality of stacked graphene plate-shaped flakes includes a physical bond or a chemical bond connecting layers, a film has a thickness of 1 nm to 10 μm, d-spacing between the one pair of stacked graphene plate-shaped flakes is in a range of 1 Å to 10 Å, and the film has a carbon/oxygen weight ratio (C/O ratio, unit: wt % of carbon/wt % of oxygen) of 3 to 99.9.

The chemical bond connecting the layers may be a —C—O—C— bond by oxygen or a π-π bond.

A method for producing a graphene membrane film for solvent purification in accordance with described embodiments includes: preparing a graphene oxide dispersion liquid by dispersing graphene oxide in distilled water; confining the graphene oxide dispersion liquid between a pair of substrates; and applying heat and pressure to the graphene oxide dispersion liquid between the substrates to perform a hydrothermal reaction to thermally reduce the graphene oxide and bind graphene at the same time.

The graphene oxide dispersion liquid may have a concentration of about 0.1 mg/ml to about 200 mg/ml.

The substrate may use a glass substrate having a surface uniformity of about ±0.1 μm.

The applying heat and pressure may include positioning the substrates, between which the graphene oxide dispersion liquid is confined, into an airtight pressure container and applying heat and pressure.

A temperature in the applying heat and pressure may be in a range of about 140° C. to about 200° C.

A time in the applying heat and pressure may be in a range of about 1 hour to about 24 hours.

An embodiment of a solvent purification system using a graphene membrane film for solvent purification includes: a filter housing provided with the graphene; and a pressure generator generating a pressure for purifying a solvent by allowing the solvent to pass through the graphene membrane film, wherein the filter housing comprises an inlet port configured to introduce a solvent before purification, an outlet port configured to discharge a solvent after purification, and a removal port configured to remove moisture and a hydrophilic component remaining during the purification of the solvent.

The removal port may communicate with a space defined before the solvent passes through the graphene membrane film in the filter housing. The inlet port may communicate with a pipe through which the solvent before purification passes, or communicate with a solvent storage tank in which the solvent before purification is stored. The outlet port may be connected to a pipe through which a purified solvent flows, or may communicate with a purified solvent storage tank in which the purified solvent is stored.

The pressure generator may be a pump provided on the inlet port side to generate a positive pressure. The positive pressure may be applied to the solvent in a range of 1.5 atm. to 3,000 atm. The pressure generator may be a vacuum pump disposed on the outlet port side to generate a negative pressure.

Advantageous Effects

In accordance with embodiments of the present disclosure, a graphene membrane film having lipophilic surface properties and fine pores may be provided. Such a graphene membrane film may be used for hydrophilic-lipophilic component separation and size exclusion separation through a polarity caused by it's properties, thereby usable in fine chemistry fields for solvent purification. The graphene membrane file may be applied to a solvent purification system for ultrapurely purifying a solvent.

According to the described embodiments, the graphene membrane film may effectively separate a hydrocarbon solvent or a polar and non-polar organic solvents, in particular, ethylene carbonate, propylene carbonate, ethyl methyl carbonate, toluene, xylene, benzene, hexane, decane, dimethylformamide, soybean oil, crude oil, and organic solvents having similar characteristics thereto.

BEST MODE FOR CARRYING OUT THE INVENTION

The present invention has various modifications and embodiments, and the descriptions of the present invention will be described along with the embodiments with reference to the drawings, and it is not intended that the present invention is limited to specific embodiments, and it is interpreted that all the modifications, equivalents and substitutions belonging to the concept and technical scope of the present invention fall within the present invention.

The terminology used herein is for the purpose of describing particular embodiments only and is not intended to limit the scope of the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

In accordance with an embodiment of the present disclosure, a graphene membrane film for solvent purification is produced by preparing dispersion liquid, confining dispersion liquid, and performing hydrothermal reaction and thermal reduction. For preparing the dispersion liquid, graphene oxide is dispersed in distilled water. For confining the dispersion liquid a graphene oxide dispersion liquid is confined between a pair of substrates. For performing the hydrothermal reaction and thermal reduction, heat and pressure are applied to the graphene oxide dispersion liquid between the substrates to thermally reduce the graphene oxide and bind graphenes at the same time.

Figure 1:
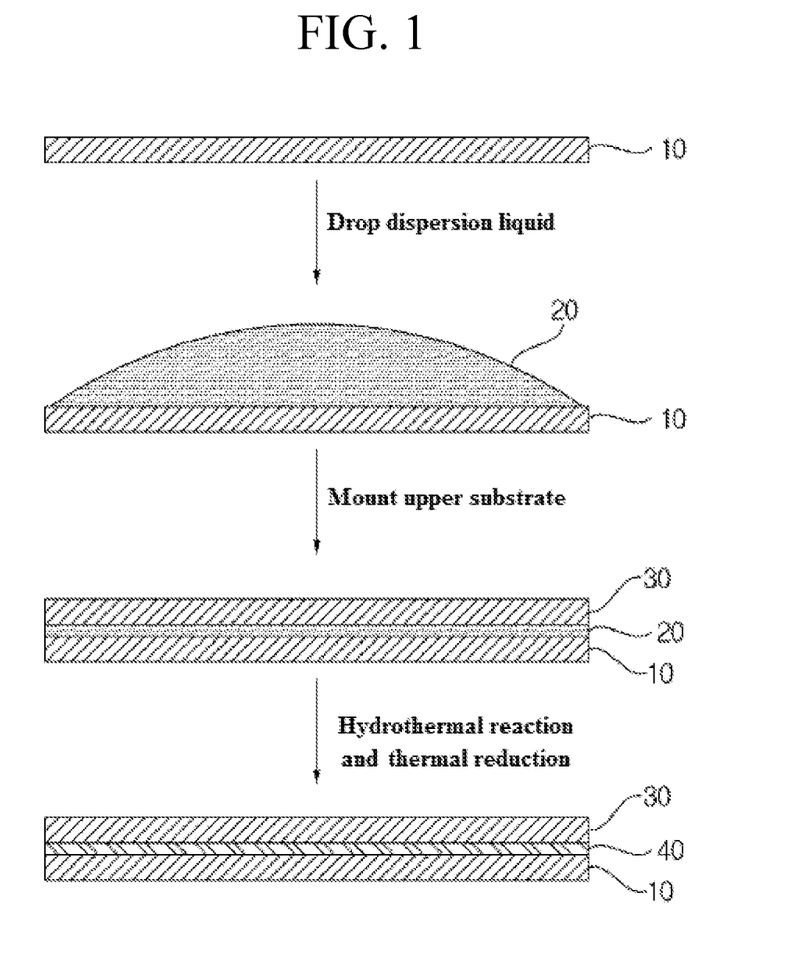
FIG. 1 illustrates a method for producing a graphene membrane film for solvent purification according to an embodiment of the present disclosure.

FIG. 1 illustrates a method for producing a graphene membrane film for solvent purification according to an embodiment of the present disclosure. Referring to FIG. 1, a graphene membrane film 40 may be produced by i) preparing an graphene oxide dispersion liquid 20 by dispersing graphene oxide in distilled water, ii) dropping the graphene oxide dispersion liquid 20 on a lower substrate 10, iii) mounting an upper substrate 30 on the lower substrate 10, and iv) performing hydrothermal reaction and thermal reduction by applying heat and pressure to the graphene oxide dispersion liquid 20 confined between the lower substrate 10 and the upper substrate 30.

The lower substrate 10 or the upper substrate 30 may be a flat glass substrate such as borosilicate glass, a soda lime glass, a silicon wafer, a silicon carbide wafer, a sapphire wafer, or the like, but the embodiments of the present disclosure are not limited thereto. Particularly, the lower substrate 10 and the upper substrate 30 may be a glass substrate having surface uniformity of ±0.1 μm or less.

The graphene oxide dispersion liquid 20 is prepared by dispersing graphene oxide plate-shaped flakes in a dispersion medium such as distilled water. The graphene oxide plate-shaped flakes may be prepared by performing an acid treatment on graphite flakes of a powder state. The acid treatment may be performed by using a Staudenmaier method (L. Staudenmaier, Ber. Dtsch. Chem. Ges., 31, 1481-1499, 1898), a Hummers method (W. Hummers et al 1, J. Am. Chem. Soc., 80, 1339, 1958), a Brodie method (B. C. Brodie, Ann. Chim. Phys., 59, 466-472, 1860), and the like, or a chemical exfoliation method (modified hummer's method, Chem. Mater. 1999. 11. 771). In an example, an acid used in the acid treatment may use $H_2SO_4$, $KMnO_4$, HCl, $HNO_3$, or the like. When $H_2SO_4$ and $KMnO_4$ are used together, very excellent oxidizing power may be obtained.

Since the graphene oxide plate-shaped flakes prepared through the acid treatment include hydrophilic groups such as a carboxyl group, a carbonyl group, an epoxy group, and a hydroxyl group, the graphene oxide plate-shaped flakes have excellent dispersibility with respect to a dispersion medium such as distilled water.

The dispersion medium may use any one selected from the group consisting of water, distilled water (ultrapure water), sodium hydroxide (NaOH), potassium hydroxide (KOH), ammonium hydroxide ($NH_4OH$), lithium hydroxide (LiOH), a calcium hydroxide ($Ca(OH)_2$) aqueous solution, acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, and mixtures thereof. In embodiments of the present disclosure, it is preferable to use the distilled water.

It is preferable that the graphene oxide dispersion liquid 20 dispersed in the distilled water has a concentration of about 0.1 mg/ml to 200 mg/ml. When the concentration of the graphene oxide dispersion liquid is less than about 0.1 mg/ml, the amount of the graphene oxide plate-shaped flakes may be small, and thus, it may be difficult to form a graphene membrane film for solvent purification. When the concentration of the graphene oxide dispersion liquid is more than about 200 mg/ml, an agglomeration phenomenon of the graphene oxide plate-shaped flakes may be excessively generated, and thus, the graphene oxide plate-shaped flakes may be unsuitable as a graphene membrane film for solvent purification.

When about 1 ml to 50 ml of the graphene oxide dispersion liquid 20 is dropped on the lower substrate 10 and the upper substrate is covered on the lower substrate 10, the graphene oxide dispersion liquid 20 is spread and confined as much as an area of the lower substrate 10 and the upper substrate 30. In addition to the method of dropping the graphene oxide dispersion liquid 20 on the lower substrate, a coating method may be used. The coating method may use spin coating, spray coating, bar coating, roll coating, immersion coating, screen printing, and the like.

If the hydrothermal reaction and thermal reduction step is performed by applying heat and pressure in the airtight pressure container in a state in which the graphene oxide dispersion liquid 20 is confined between the lower substrate 10 and the upper substrate 30, while the distilled water is evaporated and is discharged between the lower substrate 10 and the upper substrate 30, the graphene oxide plate-shaped flakes are arranged in a discharge direction of the distilled water and are closely stacked to bind graphenes to thereby bind the graphenes and form the graphene membrane film 40 for solvent purification.

A temperature of the hydrothermal reaction and thermal reduction step is in a range of about 140° C. to about 200° C. When the temperature of the hydrothermal reaction and thermal reduction step is less than about 140° C., a saturated vapor pressure may be insufficient. Thus, there may be a problem in the production of a graphene membrane film for solvent purification. When the temperature of the hydrothermal reaction and thermal reduction step is more than about 200° C., there may be a problem in container explosion and reproducibility.

In addition, a pressure of the hydrothermal reaction and thermal reduction step is in a range of about 5 bar and about 15 bar. When the pressure of the hydrothermal reaction and thermal reduction step is less than about 5° C., a saturated vapor may be insufficient. Thus, there may be a problem in the production condition of a graphene membrane film for solvent purification. When the pressure of the hydrothermal reaction and thermal reduction step is more than about 15 bar, there may be a problem in container explosion and reproducibility.

In addition, the time of the hydrothermal reaction and thermal reduction step is in a range of about 1 hour to about 24 hours. When the time of the hydrothermal reaction and thermal reduction step is less than about 1 hour, there may be a problem that a production time of a graphene membrane film for solvent purification is insufficient. When the time of the hydrothermal reaction and thermal reduction step is more than about 24 hours, it may be inefficient because the production time of the graphene membrane film for solvent purification is too long.

Figure 2:
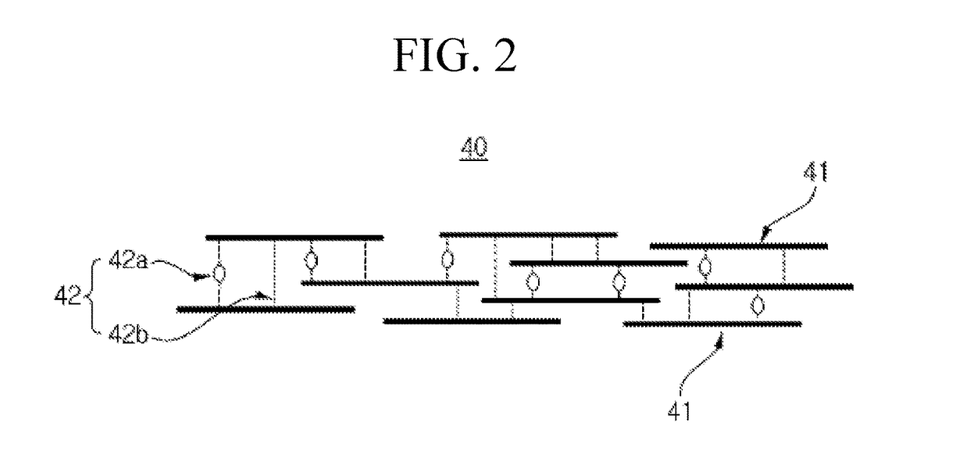
FIG. 2 is a schematic cross-sectional view of a graphene membrane film for solvent purification, which is manufactured by the method of FIG. 1 according to an embodiment of the present disclosure.

FIG. 2 is a schematic cross-sectional view of a graphene membrane film for solvent purification manufactured by the method of FIG. 1. Referring to FIG. 2, the graphene membrane film 40 for solvent purification may be prepared by vertically stacking a plurality of graphene plate-shaped flakes 41. At least one pair of the plurality of vertically stacked graphene plate-shaped flakes 41 includes a chemical bond 42 connecting layers. The graphene membrane film 40 for solvent purification has a thickness of about 1 μm to about 10 μm. A d-spacing between the pair of vertically stacked graphene plate-shaped flakes is in a range of about 1 Å to about 10 Å. The graphene membrane film 40 for solvent purification has a carbon/oxygen weight ratio (C/O ratio, unit: wt % of carbon/wt % of oxygen) in a range of about 3 to about 99.9.

In the hydrothermal reaction and thermal reduction step of the method, since the distilled water dispersing the plurality of graphene oxide plate-shaped flakes is discharged only in a side surface direction of the graphene membrane film 40, the plurality of graphene oxide plate-shaped flakes are arranged and stacked in a direction in which the distilled water is discharged.

In addition, in the performing of the hydrothermal reaction and the thermal reduction, as a hydrothermal reaction and a thermal reduction of the graphene oxide plate-shaped flakes simultaneously proceed, at least one pair of vertically stacked graphene plate-shaped flakes 41 includes the chemical bond 42 connecting the layers. The chemical bond 42 connecting the layers may be formed between surfaces of the pair of vertically stacked graphene plate-shaped flakes 41. That is, the chemical bond of the graphene plate-shaped flakes 41 may be formed between the side surfaces of the graphene plate-shaped flakes 41 and between the side surface and the front surface of the graphene plate-shaped flakes 41, but the graphene membrane film 40 is characterized in that the chemical bond of the graphene plate-shaped flakes 41 is formed between the front surfaces of the graphene plate-shaped flakes 41.

In this case, the chemical bond 42 connecting the layers may be a bond (—C—O—C—) 42a by oxygen formed between hydrophilic groups included in the graphene plate-shaped flakes 41 and may be a π-π bond 42b formed between benzene and benzene. The graphene membrane film 40 has excellent mechanical properties due to the bond 42a by oxygen and has excellent electrical properties due to the π-π bond 42b.

That is, as the graphene membrane film 40 is produced by the hydrothermal reaction and the thermal reduction, the graphene membrane film 40 is characterized by having a structure in which the graphene plate-shaped flakes 41 are stacked one by one and also having the chemical bond 42 between the layers invisible in graphene films having a structure in which existing graphene oxide plate-shaped flakes are stacked one by one.

In addition, as the hydrothermal reaction and the thermal reduction of the graphene oxide plate-shaped flakes are simultaneously performed by the hydrothermal reaction and the thermal reduction, the produced graphene membrane film 40 has a carbon/oxygen weight ratio (C/O ratio, unit: wt % of carbon/wt % of oxygen) in a range of about 3 to about 99.9. As the graphene membrane film 40 has a high carbon/oxygen weight ratio, the π-π bond between benzene and benzene is increased, thereby increasing electrical conductivity.

As described above, as the plurality of graphene oxide plate-shaped flakes are arranged and stacked through the hydrothermal reaction and the thermal reduction in a direction in which the distilled water is discharged, the amount of the graphene plate-shaped flakes 41 having an acute angle of about 80° to about 90° formed by the pair of vertically stacked graphene plate-shaped flakes 41 stacked may be less than about 10 mol % with respect to a total amount of the graphene membrane film 40. Preferably, an amount of the graphene plate-shaped flakes 41 having an angle of more than about 45° defined by the pair of vertically stacked graphene plate-shaped flakes 41 may be less than about 10 mol % with respect to a total amount of the graphene membrane film 40.

Therefore, the graphene plate-shaped flakes 41 may be more closely stacked, thereby further improving mechanical physical properties and electrical physical properties of the graphene membrane film 40.

That is, as the graphene plate-shaped flakes 41 are more closely stacked, a d-spacing between the pair of vertically stacked graphene plate-shaped flakes 41 is in a range of about 1 Å to about 10 Å.

On the other hand, the method for producing the graphene membrane film 40 for solvent purification according to the described embodiments may further include additionally reducing the graphene membrane film after the hydrothermal reaction and the thermal reduction.

Such an additional reducing step may be performed in an atmosphere of any one selected from the group consisting of hydrogen, argon, and mixtures thereof. In a case where the additional reducing step is performed in the above atmosphere, it is preferable in that oxidation caused by high temperature is prevented.

Since the additionally reduced graphene membrane film 40 has a high carbon/oxygen weight ratio and is not reduced by using a reducing agent, the graphene membrane film has a reducing agent in an amount of less than about 5 wt %, preferably about 0.001 wt % to about 1 wt %, with respect to a total amount of the graphene membrane film. When the amount of the reducing agent is more than about 5 wt %, the reducing agent may act as impurities.

The reducing agent includes sodium hydroxide (NaOH), potassium hydroxide (KOH), hydroquinone, ammonium hydroxide ($NH_4OH$), sodium borohydride ($NaBH_4$), hydrazine ($N_2H_4$), hydrogen iodide (HI), vitamin C, and the like.

The graphene membrane film 40 produced by the method for producing a graphene membrane film may be a free-standing graphene membrane film having no support substrate.

On the other hand, according to the graphene membrane film 40 produced by the method for producing a graphene membrane film, at least one pair of stacked graphene plate-shaped flakes may form a physical bond connecting layers, and a chemical bond may be various types of chemical bonds such as a Van der Waals bond or a covalent bond.

[Production Example] Production of Graphene Membrane Film for Solvent Purification Graphene oxide plate-shaped flakes were prepared through a chemical exfoliation method (modified hummer's method, Chem. Mater. 1999. 11. 771). The prepared graphene oxide plate-shaped flakes had a size of about 0.1 μm to about 10 μm.

A graphene oxide dispersion liquid was prepared by dispersing the prepared graphene oxide plate-shaped flakes in distilled water to have a concentration of about 5 mg/ml.

About 1 ml of the prepared graphene oxide dispersion liquid was dropped on a lower substrate having a size of about 1 cm× about 1 cm and made of a soda lime glass through drop coating.

An upper substrate having a size of about 1 cm× about 1 cm and made of the soda lime glass was covered on the low substrate drop-coated with the graphene oxide dispersion liquid.

Hydrothermal reaction and thermal reduction simultaneously applying heat and pressure were performed on the graphene oxide dispersion liquid confined between the lower substrate and the upper substrate at about 180° C. and about 10 bar for about 6 hours, thereby producing a graphene film having a thickness of about 100 nm.

Figure 3:
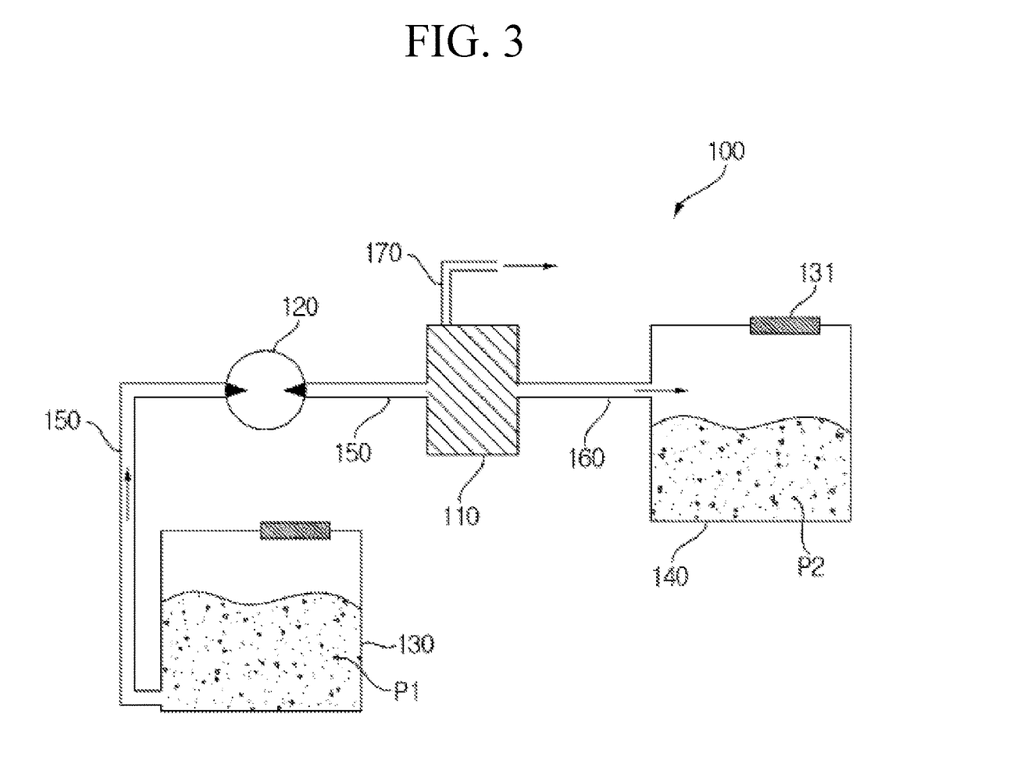
FIG. 3 illustrates a solvent purification system using a graphene membrane film for solvent purification according to an embodiment of the present disclosure.
Figure 4:
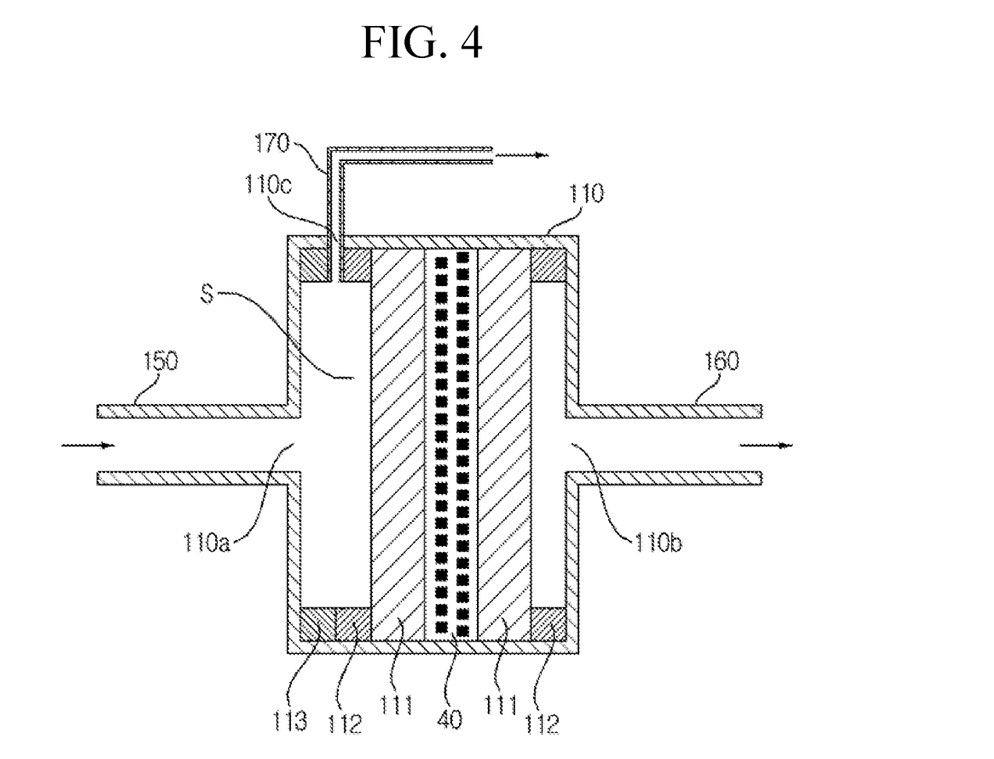
FIG. 4 is a detailed cross-sectional view of a graphene membrane film for solvent purification and a filter housing in FIG. 3 according to an embodiment of the present disclosure.

FIG. 3 illustrates a solvent purification system using a graphene membrane film for solvent purification, according to an embodiment of the present disclosure, and FIG. 4 is a detailed cross-sectional view illustrating a graphene membrane film and a filter housing in FIG. 3. As illustrated, a solvent purification system 100 using a graphene membrane film for solvent purification includes a filter housing 110 provided with a graphene membrane film 40, a pressure generator 120, a solvent storage tank 130, and a purified solvent storage tank 140.

The filter housing 110 is a housing provided with the produced graphene membrane film 40 for solvent purification and has an inlet port 110a configured to introduce a solvent before purification, an outlet port 110b configured to discharge a solvent after purification, and a removal port 110c configured to remove moisture and a hydrophilic component remaining during the purification of the solvent. The graphene membrane film 40 is supported by supports 111 on both sides, an O-ring is disposed outside of the supports 111, and a spacer 113 is disposed outside of the supports 111.

An inlet pipe 150 is connected to the inlet port 110a. Through the inlet pipe 150, the solvent before purification flows. The inlet port 110a may directly communicate with the solvent storage tank 130 through the pressure generator 120. An outlet pipe 160 is connected to the outlet port 110b. Though the outlet pipe 160, a purified solvent flows. The outlet port 110b may directly communicate with the purified solvent storage tank 140. A removal pipe 170 is connected to the removal port 110c to remove the moisture and the hydrophilic component remaining during the purification of the solvent. The removal port 110c communicates with a space S defined before the solvent passes though the graphene membrane film 40 in the housing 110.

The supports 111 may be made of a Teflon mesh or a metal mesh, be support ports through which the solvent passes, and include various forms of supports. The O-ring 112 may use various types of rings. A Viton ring is representative of the O-ring 112. The spacer 113 is a member for maintaining a gap and is selectively used.

The pressure generator 120 is a pump disposed on an inlet port side of the filter housing 110 to generate a pressure for purifying the solvent by allowing the solvent to pass through the graphene membrane film 40. The pressure generator 120 may use a hydraulic pump, an air pump, a mechanical pump, a metering pump, a high pressure pump, a cylinder pump, and the like, which generate a positive pressure. The pressure generator 120 may preferably pump a solvent by applying a pressure of about 1.5 atm. to about 3.000 atm. to the solvent. The pressure generator may be a vacuum pressure disposed on an outlet port side of the filter housing 110 to generate a negative pressure (vacuum pressure). An effective range of the negative pressure is in a range of about 1 to about 0 (vacuum zero).

The solvent storage tank 130 is a tank storing a solvent P1 before purification. The purified solvent storage tank 140 is a tank storing a purified solvent P2. Preferably, the purified solvent storage tank 140 is an airtight container having a rubber stopper 131 capable of handling a syringe. The rubber stopper 131 is used as a path for handling a purified solvent by isolating the purified solvent from air in a sealed state.

A plurality of solvent purification systems 100 described above may be sequentially installed in parallel or in series and may be used for ultrapurely purifying a solvent by purifying the solvent multiple times.

According to the solvent purification system 100 described above, since the graphene membrane film 40 is used as a separation membrane, a hydrophilic-lipophilic component separation and a size exclusion separation may be realized through a polarity caused by lipophilic surface properties and fine pores. It is effective in separating a hydrocarbon solvent or a polar and non-polar organic solvents. Among them, in particular, it is possible to separate ethylene carbonate, propylene carbonate, ethyl methyl carbonate, toluene, xylene, benzene, hexane, decane, dimethylformamide, soybean oil, crude oil, and organic solvents having similar characteristics thereto. Viscosity of a separable solvent is in a range of about 0.1 to about 5,000 mPa·s. A high viscosity separation may be realized through permeation between lipophilic components.

A separation test was performed on organic solvents by using the solvent purification system 100 according to an embodiment of the present disclosure, and examples of the separation test were shown in [Table 1]. The graphene membrane film 40 for solvent purification, which was produced in [Production Example], was provided in the solvent purification system 100, and the separation test was performed at a pressure of 2 atm. generated in the pressure generator 120. Examples of primary-pass and secondary-pass penetration were shown by continuously installing a plurality of solvent purification system 100.

The tested organic solvents were ethylene carbonate, propylene carbonate, toluene, meta-xylene, benzene, hexane, decane, and dimethylformamide. A moisture content of selected organic solvents was measured through a Karl Fischer water measurement device, and results thereof were represented in units of ppm. Moisture contents (ppm) were shown before and after organic solvents passed through a graphene membrane. A discharge amount per unit area of most organic solvents was in a range of about 3,900 liters per square hour (LMH) to about 4,200 LMH.

TABLE 1

| Organic solvent | Molecular weight (g/mol) | Density (g/cm$^2$) | Before pass (ppm) | After primary-pass (ppm) | After secondary-pass (ppm) |
| --- | --- | --- | --- | --- | --- |
| Ethylene carbonate | 88.06 | 1.321 | 195 | 8 | 5 |
| Propylene carbonate | 102.09 | 1.205 | 180 | 7 | 5 |
| Toluene | 92.14 | 0.87 | 32 | 8 | 6 |
| Meta-xylene | 106.16 | 0.86 | 27 | 9 | 6 |
| Benzene | 78.11 | 0.876 | 25 | 9 | 5 |
| Hexane | 86.18 | 0.654 | 23 | 10 | 6 |
| Decane | 142.28 | 0.73 | 24 | 10 | 6 |
| Dimethyl-formamide | 73.09 | 0.948 | 30 | 8 | 5 |

As shown in [Table 1], it can be seen that organic solvents having been almost impossible to separate in the past are also purified with high purity level.

[Description of Reference numerals]

| 10: | lower substrate | 20: | graphene oxide dispersion liquid |
| --- | --- | --- | --- |
| 30: | upper substrate | 40: | graphene membrane film |
| 41: | graphene plate-shaped flakes | 42: | chemical bond |
| 42a: | bond by oxygen | 42b: | π-π bond |
| 100: | solvent purification system | | |
| 110: | filter housing | 120: | pressure generator |
| 130: | solvent storage tank | 140: | purified solvent storage tank |
| 150: | inlet pipe | 160: | outlet pipe |
| 170: | removal pipe | | |
| P1: | solvent before purification | P2: | solvent after purification |

The invention claimed is:

1. A method for producing a graphene membrane film for solvent purification, the method comprising:
   preparing a graphene oxide dispersion liquid by dispersing graphene oxide in dispersion medium;
   confining the graphene oxide dispersion liquid between a pair of substrates; and
   applying heat and pressure to the graphene oxide dispersion liquid between the substrates to perform a hydrothermal reaction to concurrently thermally reduce the graphene oxide and bind graphenes,
   wherein the graphene oxide dispersion liquid has a concentration of about 0.1 mg/ml to about 200 mg/ml,
   wherein the applying heat and pressure comprises positioning the substrates, between which the graphene oxide dispersion liquid is confined, into an airtight pressure container and applying heat and pressure,
   wherein a temperature of the applying heat and pressure is in a range of about 140° C. to about 200° C.,
   wherein a time of the applying heat and pressure is in a range of about 1 hour to about 24 hours, and
   wherein a pressure of the applying heat and pressure is in a range of about 5 bar and about 15 bar.

2. The method of claim 1, wherein the graphene oxide comprises graphene oxide plate-shaped flakes.

3. The method of claim 2, wherein the graphene oxide plate-shaped flakes has a size of about 0.1 µm to about 10 µm.

4. The method of claim 1, wherein a thickness of the film is about 1 nm to about 10 µm.

5. The method of claim 1, wherein the pair of substrates comprises a borosilicate glass, a soda lime glass, a silicon wafer, and a sapphire wafer.

6. The method of claim 1, wherein the film comprises a plurality of stacked graphene plate-shaped flakes.

7. The method of claim 5, wherein at least one pair of the plurality of stacked graphene-shaped flakes comprises a physical bond or a chemical bond connecting layers.

8. The method of claim 6, wherein the film has a carbon/oxygen weight ratio (C/O ratio, unit: wt % of carbon/wt % of oxygen) of about 3 to about 99.9.

9. The method of claim 7, wherein a d-spacing between the at least one pair of stacked graphene plate-shaped flakes is in a range of about 1 Å to about 10 Å.

10. The method of claim 8, wherein the chemical bond connecting the layers is a —C—O—C— bond by oxygen or a π-π bond.

* * * * *